Patented Dec. 27, 1932

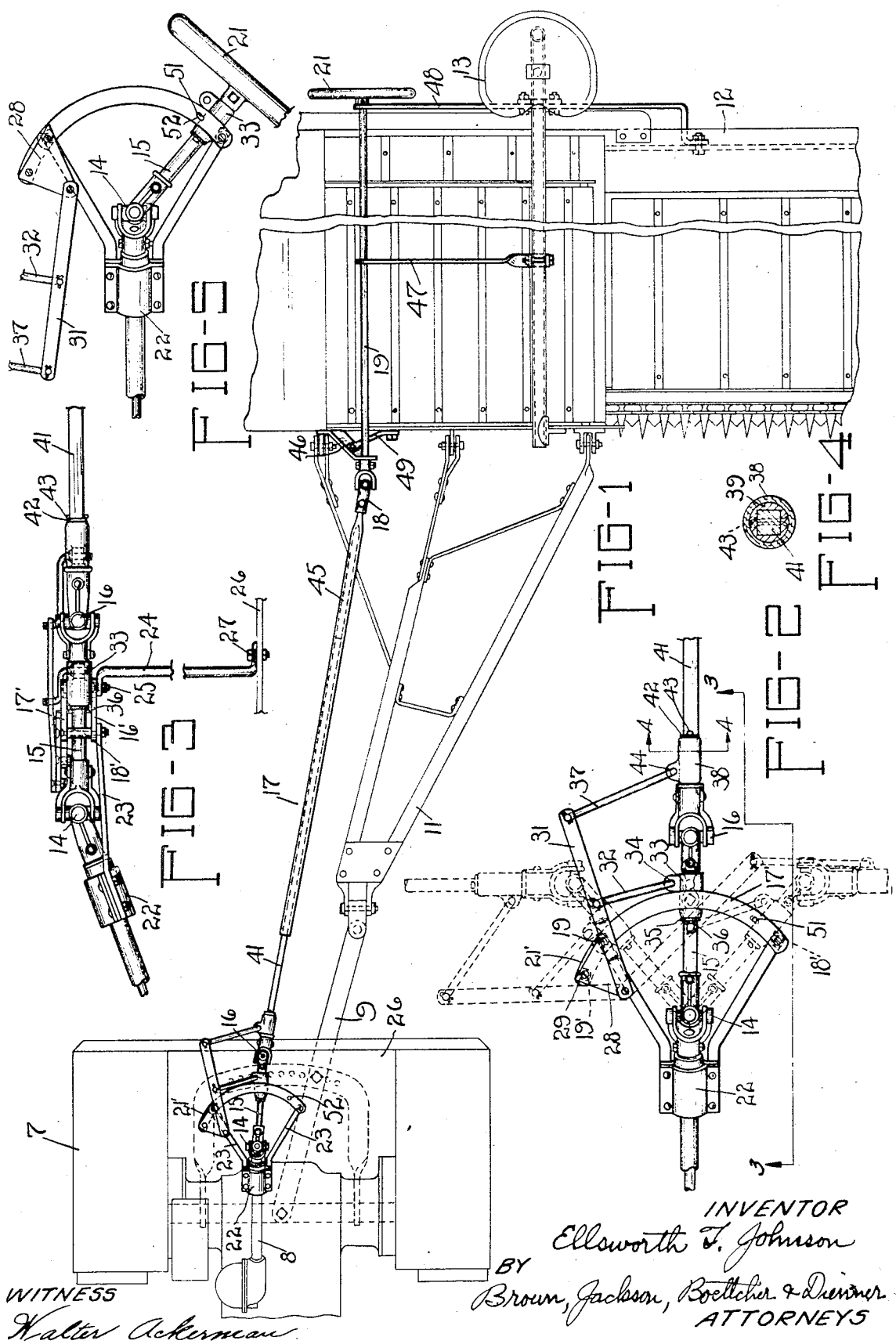

1,892,108

UNITED STATES PATENT OFFICE

ELLSWORTH T. JOHNSON, OF MOLINE, ILLINOIS, ASSIGNOR TO DEERE & COMPANY, OF MOLINE, ILLINOIS, A CORPORATION OF ILLINOIS

MOTION TRANSMITTING MECHANISM

Application filed September 27, 1929. Serial No. 395,532.

The present invention relates to motion transmitting connections such as may be employed for transmitting steering control from a farm implement to a tractor propelling the former, although, as will later appear, the present mechanism may be employed for transmitting rotary motion for any purpose between two pivotally coupled vehicles.

In connections for transmitting rotary motion between a tractor and an implement drawn thereby, whether it be a steering connection or a power take-off connection, at least two universal joints are required. In operation, when turning, the implement frequently assumes an angular position with respect to the tractor such that the longitudinal axis of the latter is perpendicular to the longitudinal axis of the former.

It has been found in practice that a single universal joint will not transmit power without the danger of becoming locked if the shaft portions thereof assume a relative angular position of less than 135° i. e., if one of the shaft portions is deflected substantially more than 45° from the axis of the other. Hence at least two universal joints are necessary in any such power transmitting connection or system. I have found that when such a system is used, provision must be made whereby the angular relation between the tractor and implement must be equally divided between the two or more universal connections, so as to avoid the possibility of one of the universal joints assuming an angular relation of less than 135° and thereby subjecting it to the danger of becoming locked when the tractor and implement are making a sharp turn.

The present invention relates to a rotary motion transmitting system, the elements of which are so constructed and so proportioned and positioned with respect to the universal joints in the system, that the angle of turning is divided substantially equally between the joints. This makes it possible to make a turn whereby the implement may be positioned at an angle up to 90° relative to the tractor without the danger of either one of the universal joints becoming locked.

What has been said concerning the steering connection between the tractor and the implement, is equally true of a power take-off connection between the tractor and implement.

While the present invention is illustrated as applied to the steering connection, it is not limited to this use, and, as will be understood by those skilled in the art, may also be applied in a power take-off connection between the tractor and implement, such as is commonly employed for transmitting tractor power to driven parts on the implement.

One of the objects of this invention is to provide a connection of novel, positive and durable construction for the purpose above set forth.

Another object is the provision of a connection wherein two or more universal joints are employed and whereby the tractor and drawn implement may assume relative angular positions up to 90° without the danger of the universal joints becoming locked.

A further object is the provision of a connection whereby the angle between the tractor and implement is substantially equally divided between the universal joints in the intermediate angles as well as in the extreme angles.

Another object is the provision of an arrangement whereby in turning the relative angle between the tractor and implement is so divided between the universal joints in the connection that no one of the joints is thrown into an angle of less than 135°, thereby avoiding the danger of its becoming locked.

A further object of the invention is to provide a construction which will quickly permit disconnection of the linkage and temporary steering of the tractor from the operator's position on the tractor without the necessity of removing from the tractor the special attachments which adapt the remote control steering mechanism thereto.

Another object is the provision of a steering coupling mechanism which may be readily attached to the steering column and post of a tractor.

Further objects and advantages will appear from the following detailed description, taken in connection with the accompanying drawing showing a preferred embodiment of the invention. In this drawing:

Figure 1 is a plan view showing a portion of a tractor and a portion of a binder connected thereto, and the steering connection by which the tractor may be steered from the binder;

Figure 2 is an enlarged fragmentary plan view of the connection at the tractor showing in dotted lines the extreme positions of the universal joints when making either a right or left-hand 90° turn;

Figure 3 is a side elevation of the connection shown in Figure 2;

Figure 4 is a cross-sectional view taken on line 4—4 of Figure 2; and

Figure 5 is a plan view showing the manner in which the steering wheel may be positioned at the tractor after the implement has been disconnected from the tractor.

For purposes of illustration a fragmentary plan of a binder has been shown, drawn by tractor 7 provided with steering shaft and column 8, and a hitch 9 to which is connected a tongue 11 of the binder 12. The steering mechanism by which the tractor is to be guided from the seat 13 of the binder comprises primarily a universal joint 14, an intermediate shaft 15, a second universal joint 16, a telescopic shaft connection 17, a third universal joint 18, a third shaft 19 and steering wheel 21.

The mechanism is connected to the steering column and shaft 8 by first removing the regular steering wheel from the post end and replacing it with the universal joint 14 and suitably securing the joint thereto.

The intermediate shaft 15 is supported and restrained from vertical movement in a guide member comprising two horizontally disposed arcuate members 16' and 17' held in fixed spaced relation one above the other by means of the sleeves 18' and 19', one at each end of the lower arcuate member 16', with bolts passing through the sleeve and arcuate members. The upper arcuate member 17' extends out beyond the lower one 16' at 21' for a purpose to be hereinafter described. The guide member is supported on the steering column by means of two semi-cylindrical brackets 22 bolted around the column, from which extend two rearwardly diverging arms 23 with their rear ends each secured to the respective ends of the lower arcuate member 16'. The guide member is also supported on the tractor by means of a vertical rod 24 bolted to the center of the under side of the member 16 at one end, by means of a countersunk bolt 25, and to the platform 26 of the tractor at the other end, by means of the bolt 27.

A triangularly shaped bracket 28 is secured to the projecting end 21' of the upper arcuate member by means of countersunk bolt 29 and the countersunk bolt passing through the right hand spacing sleeve 19'. At the forward end of the bracket 28 a link 31, having a slightly off-set intermediate portion, is pivoted. This link is pivotally connected approximately at its center, by a link 32 to a sleeve 33 embracing the intermediate shaft 15.

A small laterally extending lug 34 on sleeve 33 is adapted to receive for pivotal connection the link 32. Sleeve 33 is positioned between the end of the second universal joint 16, which is suitably secured to the intermediate shaft 15 beyond the guide structure, and a washer 35 held in position on the intermediate shaft by a cotter pin 36. The end of link 31 is pivotally connected by means of a link 37 to a sleeve 38 which embraces an inner sleeve 39 (Figure 4) having a cylindrical periphery and a square bore fitting over a square shaft section 41. This sleeve is held in position behind the second universal joint 16 between the joint and a washer 42 held in position by a cotter pin 43, and is provided with a lug 44 for pivotal connection with the link 37. The links 32 and 37 may be held in position at both ends by cotter pins.

Telescopic shaft 17 comprises the square shaft 41 which is connected at one end to the universal joint 16 and has the other end sliding freely in the tubular shaft portion 45, the latter having a square bore. This telescopic shaft connects the universal joint 16 to a third universal joint 18, in turn connected to the shaft 19. The latter shaft is supported on the binder by the brackets 46, 47 and 48, the bracket 46 being braced by the rod 49. Suitably secured to the outer end of the shaft 19 is the steering wheel 21. This shaft is so positioned on the binder that the steering wheel is in close proximity to the operator's seat 13 so as to be easily accessible to the operator.

Referring now to Figure 2, it will be seen that when the tractor is turned to a position to make a sharp turn, as the rear shaft 41 moves to either dotted line position, the link 37 moves the link 31 in the direction of its movement. The link 31, being pivoted to the stationary support moves about its pivot so that the intermediate portion of the link transmits movement to the shaft 15 through the link 32. In view of the rigidity of the links 31, 32 and 37, the distances between the pivot points of the links remain constant, thus compelling the intermediate shaft 15 to move out of alignment with the vertical plane of the steering post. Thus, as the shaft 41 assumes an angular relation to the vertical plane of the steering post of the tractor 7, the intermediate shaft 15 likewise is compelled to assume an angular position relative to the vertical plane of the steering post independent of the angular movement which might be transmitted through the universal joint 16.

In the two extreme positions shown in dotted lines in Figure 2, it is to be noted that neither of the universal joints assumes an angle of less than 135° and that both joints assume substantially equal angular positions, so that the total angle of turning is substantially equally divided between these two universal joints. Due to the linkage system employed a positive substantially equal distribution of the angular relation between the shaft 41 and the steering post, takes place in all angular relations of these two members.

When it is desired to disconnect the tractor from the binder so that the tractor may be independently operated and steered, the cotter pins may be removed from the ends of links 32, 37, the ends of the links withdrawn from the lugs 34, 44, and the universal joint 16 disconnected from the intermediate shaft 15. As indicated in Figure 5, the links 31, 32 and 37 may be rotated to the position shown. The intermediate shaft 15 is then rotated to the position shown and a cotter pin 51 inserted through holes 52, 52 in the arcuate members 17 and 16, to retain the shaft in this position. The regular steering wheel 21 may then be suitably secured to the shaft.

It will thus be seen that a simple, efficient, positive and durable steering connection has been provided whereby a tractor or power means may be steered from an implement propelled thereby. While a preferred embodiment has been shown as applied to the steering mechanism, the invention is not limited thereto, being capable of application to a power take-off means, and I do not wish to limit it to a steering mechanism, as it may be variously modified and altered for similar uses without departing from the spirit of the invention and I intend to include all such variations within the scope of the appended claims.

What I claim as new and desire to secure by Letters Patent is:

1. In a motion transmitting means adapted to transmit motion from one pivotally connected vehicle to another comprising a plurality of shafts, means for substantially distributing the angularity between the shafts, in substantially all relative angular positions of said vehicles, comprising bearings on three of the shafts, a bracket engaged to the bearing of one shaft and provided with means for pivotally supporting an intermediate shaft, a link pivotally engaged to the bracket and other links pivotally engaged to the first link and to the other bearings.

2. In a motion transmitting means adapted to transmit motion from one pivotally connected vehicle to another comprising two end shafts and an intermediate shaft, bearings on each shaft, universal joints connecting the shafts, and means for substantially equally distributing the angularity between the shafts, in substantially all relative angular positions of said vehicles, comprising a member pivotally attached to a portion of the bearing on an end shaft and other members pivotally engaged to the other bearings and to the first named member.

3. In a motion transmitting means adapted to transmit motion from one pivotally connected vehicle to another comprising a plurality of shafts, means for supporting one of said shafts for horizontal pivotal movement, and means pivotally associated with said supporting means, and engaging both the supported shaft and another shaft for substantially equally distributing the angularity between said shafts in substantially all relative angular positions of said vehicles.

4. The combination with a train of pivotally connected vehicles, a motion transmitting means comprising an articulated line of shafting between adjacent vehicles comprising two end shafts and an intermediate shaft, universal joints connecting said shafts, of means connected with said intermediate shaft for transmitting lateral deflecting movement from one of said end shafts to said intermediate shaft independent of the universal joint connecting said shafts.

5. The combination with a train of pivotally connected vehicles, a motion transmitting means comprising an articulated line of shafting between adjacent vehicles comprising two end shafts and an intermediate shaft, said intermediate shaft being positioned on a support, and universal joints connecting said shafts, of means for transmitting lateral deflecting movement from one of said end shafts to said intermediate shaft independent of the universal joint connecting said shafts, comprising push and pull means associated with said intermediate shaft between the ends thereof, and with one of said end shafts and said support.

6. In a steering mechanism for a train of pivotally connected vehicles comprising a guide member adapted to be secured to a steering column on one of the vehicles, a shaft member adapted to be secured to a steering post on said column and pivotally guided in said guiding member, a shaft connected to said shaft, means associated with said guide member and shafts and adapted to substantially equalize the angularity between said shafts in substantially all relative angular positions of said vehicles.

7. A steering mechanism for a train of pivotally connected vehicles comprising a guide member adapted to be secured to a steering column on one of said vehicles, a shaft member adapted to be secured to a steering post and pivotally guided in said guide member, a shaft connected to said last named shaft, and means comprising links connected to said guide member and shafts for substantially equalizing the angularity between said shafts in substantially all relative angular positions of said vehicles.

8. A steering mechanism for a train of pivotally connected vehicles comprising a guide member adapted to be secured to a steering column on one of said vehicles, a shaft member adapted to be secured to a steering post in said column and pivotally guided by said guide member, a shaft connected to said last named shaft and removably connected means associated with said guide and shafts for substantially equalizing the angularity between the shafts in substantially all relative angular positions of said vehicles.

9. The combination with a draft vehicle, and a drawn vehicle, of motion transmitting means comprising a plurality of coupled shafts, one of said shafts being pivotally guided in a support, and means movably connected with said support and two of the shafts for substantially equally distributing the angularity between the shafts in substantially all relatively angular positions of said vehicles.

10. The combination with a draft vehicle and a drawn vehicle, of a motion transmitting means comprising a plurality of coupled shafts, one of said shafts being pivotally guided in a support and means pivotally associated with said support and removably associated with said shafts for substantially equally distributing the angularity between said shafts in substantially all relatively angular positions of said vehicles, the support being provided with means to retain the pivotally guided shaft in fixed position with respect to said support but permitting manual rotation thereof.

11. The combination with a motion transmitting means comprising a plurality of shafts connected together by universal joints of means for substantially equalizing the angularity of the shafts when one shaft assumes an angular relation to the others, said means comprising links connected to a plurality of said shafts.

12. The combination with a motion transmitting means comprising a plurality of shafts connected together by universal joints, certain of said shafts being mounted on a support, of means for substantially equalizing the angularity of the shafts when one shaft assumes an angular relation to the others, said means comprising links connected to adjacent shafts.

13. In combination, a power transmitting means comprising a driving shaft, a driven shaft, and an intermediate shaft, connected together by universal joints, and means for substantially equalizing the angularity of the shafts when the driven shaft assumes an angular position relative to the others, comprising a bracket engaged on one of the shafts and means pivoted to the bracket and associated with the intermediate shaft and one of the other shafts.

14. In a motion transmitting means adapted to transmit motion from one pivotally connected vehicle to another comprising a plurality of shafts, means for substantially equally distributing the angularity of the shafts, said means comprising two links, one for each of two of said shafts.

15. In a motion transmitting means adapted to transmit motion from one pivotally connected vehicle to another comprising a plurality of shafts, universal joints connecting said shafts, and means for substantially equally distributing the angularity of said shafts, said means comprising two links and a bearing at each of two shafts to which said links are respectively connected.

16. In a motion transmitting means adapted to transmit motion from one pivotally connected vehicle to another comprising a plurality of shafts, means for supporting one of said shafts for horizontal pivotal movement, and means comprising links associated with two of said shafts and with said supporting means for substantially equally distributing the angularity of said shafts.

17. In a motion transmitting means adapted to transmit motion from one pivotally connected vehicle to another comprising a plurality of shafts, means for supporting one of said shafts for horizontal pivotal movement, and means comprising links capable of transmitting tension and compression stresses associated with said supporting means and with one of said shafts for substantially equally distributing the angularity of said shafts.

18. In a motion transmitting means adapted to transmit motion from one pivotally connected vehicle to another comprising a plurality of shafts, means for supporting one of said shafts for horizontal pivotal movement and means comprising a bearing on one of said shafts and a link pivoted to said bearing and associated with said support for substantially equally distributing the angularity of said shafts.

19. In a motion transmitting means adapted to transmit motion from one pivotally connected vehicle to another comprising a plurality of shafts connected by universal joints, a support fixed on one of the vehicles, an arm pivotally conected to the support, bearings on two of said shafts, and a pair of links pivotally connected at spaced points to said arm and to said bearings, respectively.

20. In a motion transmitting means adapted to transmit motion from one pivotally connected vehicle to another comprising a plurality of shafts connected by universal joints, a support fixed on one of the vehicles, an arm pivotally connected on the support, bearings on two of said shafts and a pair of links pivotally connected at spaced points to said arm and to said bearing, respectively, one of said links being connected to said arm at a point substantially twice the distance that the other link is connected to said arm.

In witness whereof, I have hereunto subscribed my name this 23rd day of September, 1929.

ELLSWORTH T. JOHNSON.